INVENTOR
EDWARD H. REMDE,
BY Geo. B. Pitts
ATTORNEY

Jan. 30, 1951 E. H. REMDE 2,539,552
MOTOR BRAKING AND LINE CIRCUIT CONTROL
Filed July 1, 1946 4 Sheets-Sheet 2
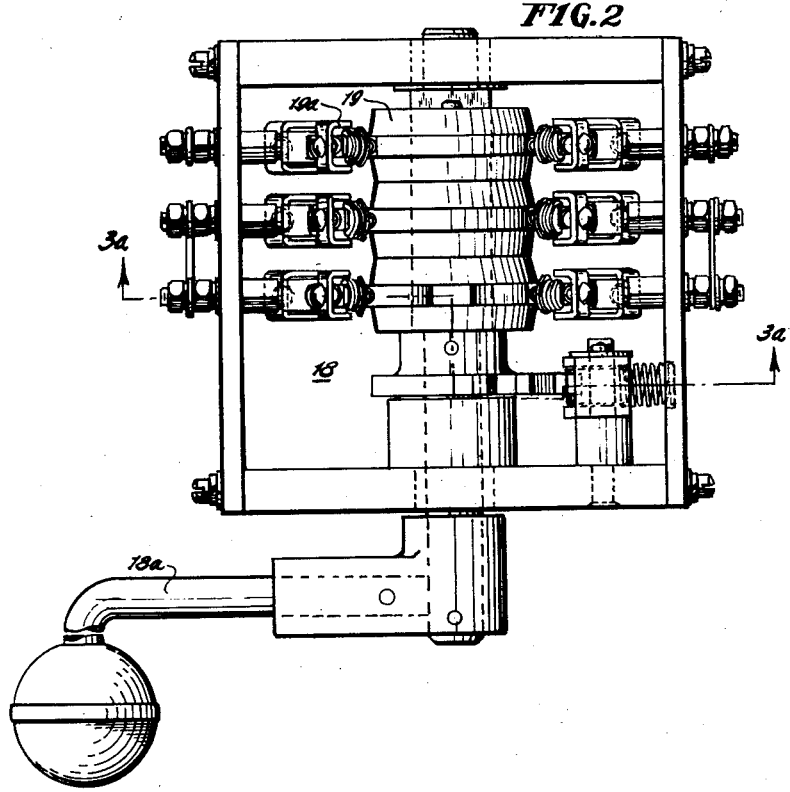
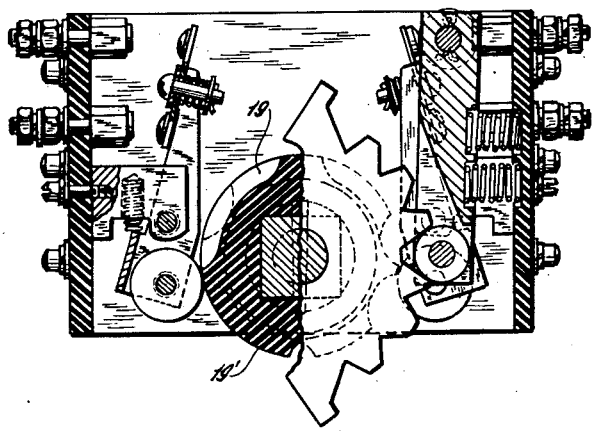
INVENTOR.
EDWARD H. REMDE
BY
Geo. B. Pitts
attorney Jan. 30, 1951          E. H. REMDE          2,539,552

MOTOR BRAKING AND LINE CIRCUIT CONTROL

Filed July 1, 1946          4 Sheets-Sheet 3

INVENTOR.

EDWARD H. REMDE.

BY Geo. B. Pitts

ATTORNEY

Jan. 30, 1951     E. H. REMDE     2,539,552
MOTOR BRAKING AND LINE CIRCUIT CONTROL
Filed July 1, 1946     4 Sheets-Sheet 4
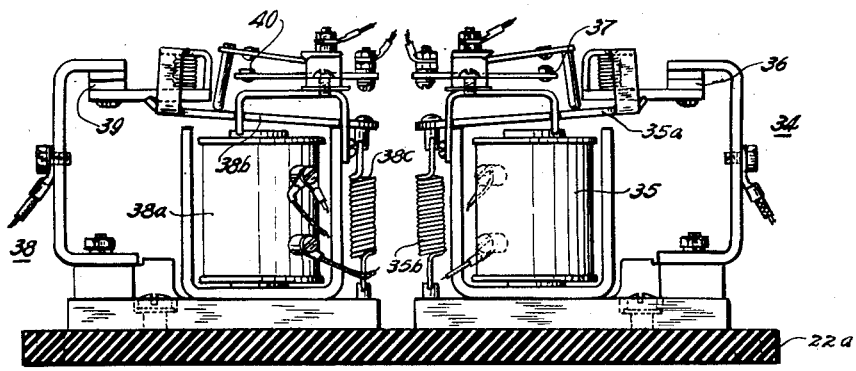
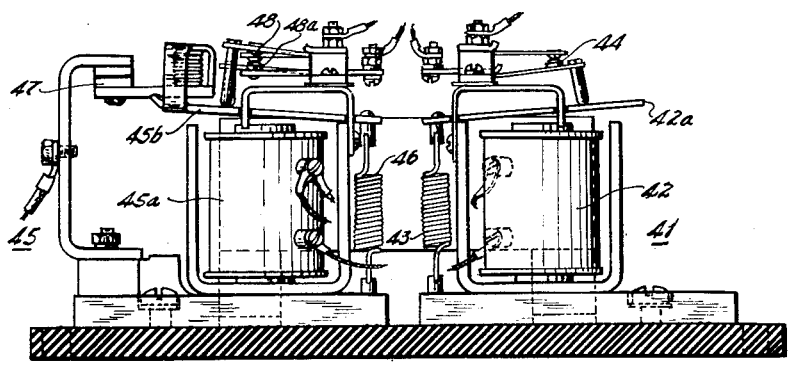
INVENTOR.
EDWARD H. REMDE.
BY
         *Geo. B. Ritter*
ATTORNEY.

Patented Jan. 30, 1951

2,539,552

UNITED STATES PATENT OFFICE 2,539,552

MOTOR BRAKING AND LINE CIRCUIT CONTROL

Edward H. Remde, Cleveland, Ohio, assignor to The Baker-Raulang Company, Cleveland, Ohio, a corporation of Ohio Application July 1, 1946, Serial No. 680,585

7 Claims. (Cl. 318—259)

This invention relates to a power driven vehicle, more particularly to the controlling means for its propelling motor and/or one or more operating mechanisms with which the vehicle may be equipped.

One object of the invention is to provide in a truck of this type improved electrically operated means for its propelling motor controlled automatically by the movement of a controller relative to its neutral position to vary the speed of the motor or brake its operation, so that when the truck is moving in either direction, such movement may be readily controlled or regulated to meet various travel conditions, that is, whether the travel surface is disposed horizontally or inclined and/or other conditions.

Another object of the invention is to provide an improved control means for the propelling motor of a vehicle operable at varying speeds, wherein provision is made for automatically accelerating the motor speed to a predetermined high speed by initially operating the control device to one operating position and then operating the control device to the predetermined high speed operating position.

Another object of the invention is to provide an improved control means for the propelling motor of a vehicle operable at varying speeds, wherein provision is made (a) for automatically accelerating the motor speed, for driving the vehicle in either direction, at a predetermined high speed by initially operating the control device from its neutral position to one position and operating the control device to the predetermined high speed position and (b) automatically braking the motor upon movement of the control device beyond its neutral position in the reverse direction.

Another object of the invention is to provide in a truck of this type, having a motor to be driven at different speeds, a set of related electrically operated contacts automatically operable by the movement of a manually operated device to control the supply of current to the motor to drive it at low or a higher speed and back to low speed and/or neutral position without danger of damaging the motor or the electrical connections therefor.

Another object of the invention is to provide an improved truck having electrically operated controlling means for the propelling motor thereof and a device operable to connect the controlling means and motor with a source of current supply, the controlling means, dependent upon the movement of the device from neutral to an operated position, in either direction, being arranged to vary the speed of the motor and to automatically effect a braking action on the motor upon movement of the device in the opposite direction beyond its neutral position.

Another object of the invention is to provide for a truck having an electric motor to propel it at varying speeds, a circuit connected with a current supply means, a safety switch in the circuit and a controller movable to low and high speed positions, improved electrically operated control means operable by the movement of the controller to low and high speed positions to accelerate the speed of the motor and in event the safety switch is opened, to automatically prevent operation of the motor, except upon closing of the safety switch and by movement of the controller to low speed position.

A further object of the invention is to provide in a motor driven vehicle of this type, having an electric circuit connected with a source of current supply and a safety switch for the circuit, improved control means consisting of related contactors operable in co-ordinated relation to the open or closed position of the switch and with the movement of the controller relative to its neutral position to drive the motor and propel the vehicle in either direction to control the speed or stoppage of the motor.

Another object of the invention is to provide for a self-propelled truck, improved electrical means for controlling the driving of the truck propelling motor in either direction and during movement of the truck in either direction to dynamically brake the motor and automatically prevent supply of current thereto to drive the motor in the opposite direction until its speed has been retarded to a minimum.

Another object of the invention is to provide for a truck having a propelling motor drivingly connected to certain wheels thereof, a source of electric current supply and a controller, improved electrical means, including devices arranged to be actuated thereby, controlled by the controller to drive the motor in either direction to propel the truck forwardly or backwardly and, during the movement of the truck in either direction and operation of the controller to a reverse operating position, to automatically disconnect the motor from the source of current supply, reverse the circuit connections to the motor, whereby the latter dynamically retards the speed of the motor, and actuates the devices to prevent connection of the motor with the source of current supply until the motor speed has been reduced to a safe value.

Another object of the invention is to provide for a truck having a propelling motor drivingly connected to certain of the wheels of the truck, a source of electric current supply and a circuit for the motor, improved electrical means including a circuit connected to the source of supply and electrical devices in the circuits disposed in co-ordinated relation, controlled by an manually operated member and arranged upon movement thereof from neutral position in either direction to drive the motor at different speeds, said devices, during movement of the truck in either direction and upon movement of the member to the opposite side of its neutral position, being arranged (a) to disconnect the motor circuit from the source of supply, (b) reverse the connections of the motor circuit to the motor and (c) provide a selective dynamic braking of the motor dependent on the operation of the member relative to its neutral position, to retard the speed of the motor.

Other objects of the invention will be apparent to those skilled in the art to which my invention relates from the following description taken in connection with the accompanying drawings, wherein Figure 1 is a diagram of the circuit for energizing and controlling the operation of the propelling motor of the truck.

Fig. 2 is a plan view of the controller for the electrically operated means for the propelling motor of the truck.

Fig. 3 is a section on the line 3a—3a of Fig. 2.

Figure 4:
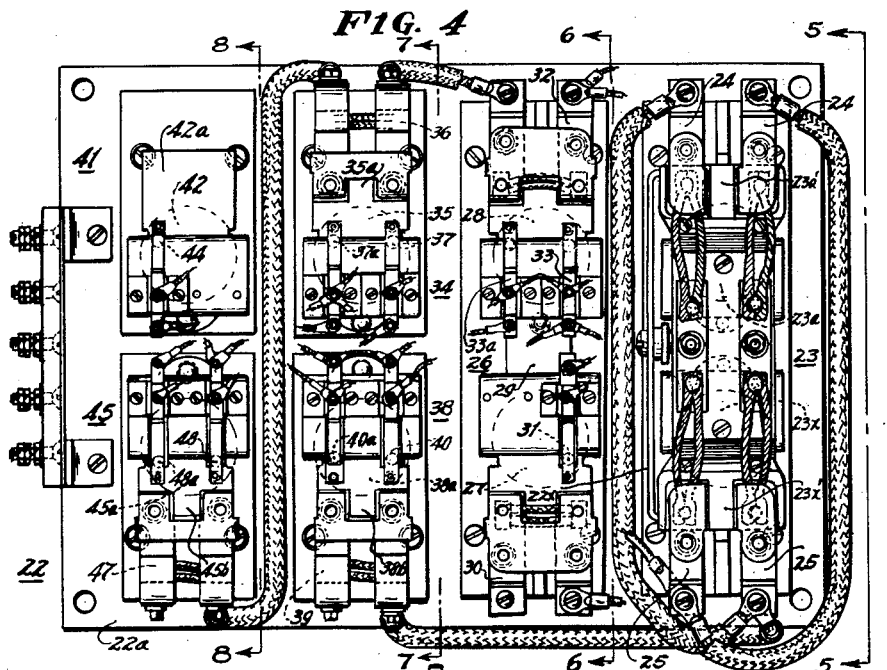
Fig. 4 is a plan view of the electrically operated means for controlling the propelling motor.
Figure 5:
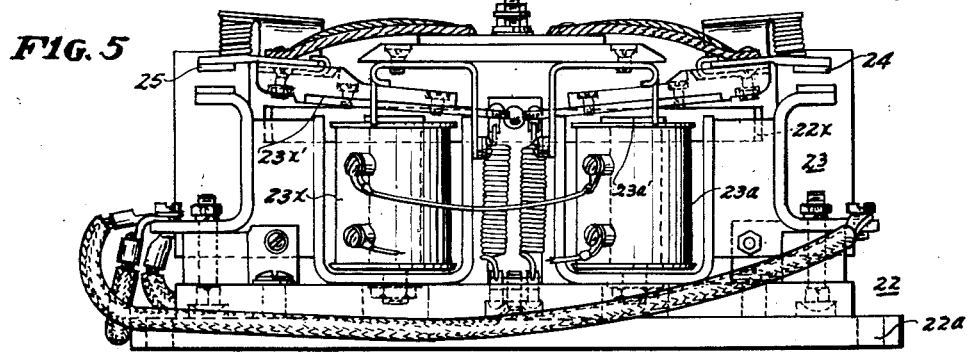
Figure 6:
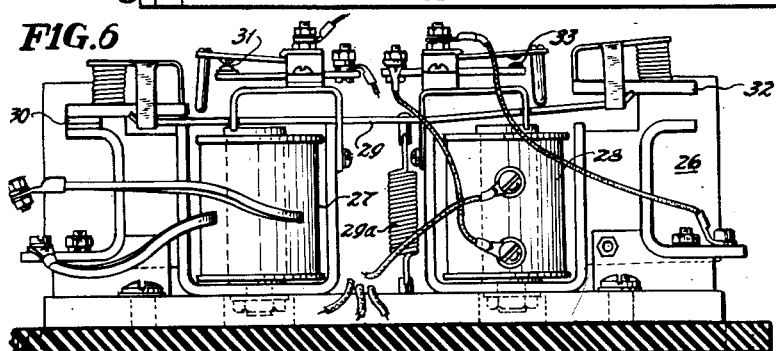

Figs. 5, 6, 7 and 8 are elevational views on the lines 5—5, 6—6, 7—7 and 8—8, respectively, of Fig. 4.

Figure 1:
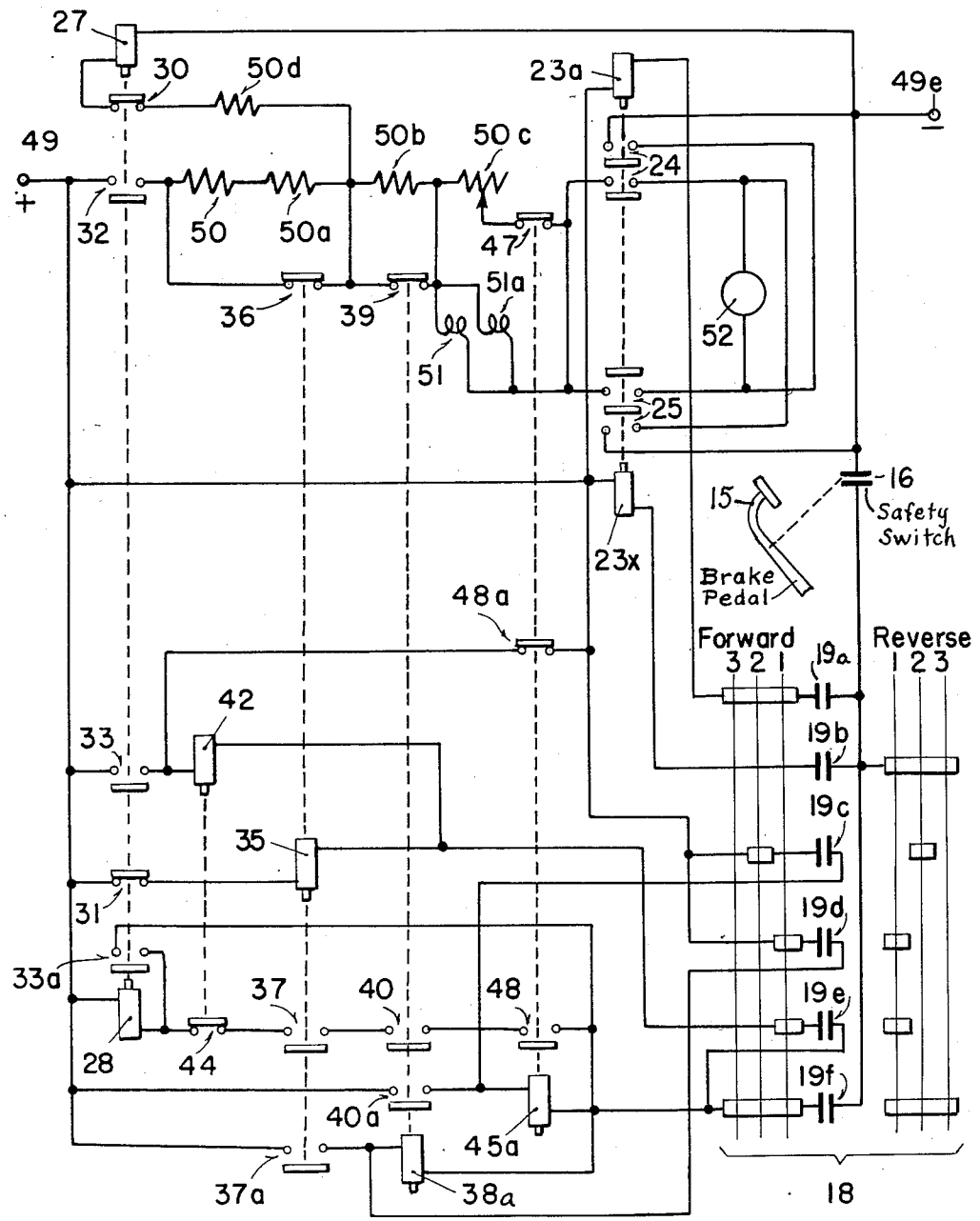

In Figure 1 of the drawing the propelling motor is represented as being formed of an armature 52 and a pair of field windings 51 and 51a which are energized through various control devices from a power supply circuit having terminals at 49 and 49a. Operation of the motor is controlled by controller represented at 18 having a movable element operable from a neutral position in one direction for forward operation of the truck and in the other direction for the reverse operation of the truck. 15 indicates a foot pedal associated with the operative's station. The pedal 15 is operatively connected to the mechanical brake, such as is usually employed in industrial trucks, which brake is normally applied under spring pressure to the shaft of the motor to hold the truck against movement when not in use, the movement of the pedal 15 downwardly a predetermined distance serving to release the brake and further movement of the pedal 15 downwardly serving to close a normally open safety switch 16 (see Fig. 1) in a circuit leading to controller 18, whereby operation of a controller 18 will be effective to drive the motor, as later set forth. The controller 18 is provided with a drum 19 having cams 19′ which operate switches 19a, 19b, 19c, 19d, 19e, 19f (see Fig. 9) in the manner later set forth, the drum 19 being rotated by a handle 18a.

22 indicates as an entirety electrically operated controlling means (see Fig. 4) for the motor. The controlling means 22 consists of the following: 23 indicates an electrical reverser contactor unit comprising (a) two shunt coils 23a, 23x, the coil 23a having an armature 23a′ arranged to close the normally open contacts 24, 24, and coil 23x having an armature 23x′ arranged to close the normally open contacts 25, 25; and (b) a mechanical interlock 22x fulcrumed between its opposite ends and arranged to be rocked by either armature 23a′, 23x′, to prevent closing of both contacts 24—24, 25—25, simultaneously, but permitting either of the contacts to be closed as required. As shown, the outer end portions of the armatures 23a′, 23x′, extend over the opposite ends of the mechanical interlock 22x, so that when either armature is operated it engages with the adjacent end of the mechanical interlock 22x and rocks it, thereby disposing it in the path of movement of the other armature to prevent operation of the latter. 26 indicates a line relay or contactor unit comprising a series coil 27, a shunt coil 28 and an armature 29 fulcrumed between its opposite ends and normally biased by a spring 29a in one direction to close the contacts 30 and interlock contacts 31 and open the contacts 32 and open the interlock contacts 33, 33a. 34 indicates a contactor unit comprising a timer coil 35 having an armature 35a normally biased by a spring 35b to close the contacts 36 and open the interlock contacts 37, 37a. 38 indicates a contactor unit comprising a coil 38a having an armature 38b normally biased by a spring 38c to close the contacts 39 and open the interlock contacts 40 and contacts 40a. 41 indicates a time delay relay comprising a timer coil 42 having an armature 42a normally biased by a spring 43 to close the interlock contacts 44. 45 indicates a contactor consisting of a timer coil 45a having an armature 45b normally biased by a spring 46 to close the contacts 47 and open the interlock contacts 48 and close the contacts 48a.

The controller 18 and contacts, as shown in Figs. 4, 5, 6, 7, and 8, are in neutral position; that is, the position in which all circuit connections and the motor are disconnected from the battery 14. The operation to drive the motor and propel the truck in the forward direction is as follows; first, the pedal 15 is operated to release the mechanical brake 15x associated with the motor and close the safety switch 16 and next the controller is moved to the first operating position, closing switches 19a, 19d, 19e and 19f. Closing of switch 19a energizes coil 23a, to operate the armature 23a′, which in turn closes contacts 24, 24; as shown in Fig. 4, the armature 23a′ overlaps the adjacent end of the mechanical interlock 22x and engages therewith, in closing the contacts 24, 24, to rock the interlock 22x on its fulcrum to position its opposite end in the path of movement of the armature 23x′ and hence prevent closing of the contacts 25, 25, so long as the contacts 24, 24, are closed; this operation of the controller 18 energizes coils 35, 42, and 38a, which are energized through switches 19d, 19e, and 19f to open contacts 36 and close contacts 37, 37a, and open interlock contacts 44, open contacts 39, close contacts 40, 40a. Closing of contact 40a energizes coil 45a to open contacts 47 and 48a and close contacts 48. With contacts 48a open, coil 42 is de-energized, and after a predetermined time delay, contacts 44 close and shunt coil 28 is energized, closing contacts 32. Line contact 32 does not close immediately upon operation of controller 18 to the low speed position, but the closing of this contact is delayed by the delay in the release of relay 42. The operation of the contacts and interlock contacts as above set forth connects in the main circuit 17′, which may be traced as follows; 49 indicates the supply lead connected with the positive side of the battery 14, lead 49a, contacts 32, lead 49a′ through resistances 50, 50a, 50b, lead 49b, through parallel series fields 51, 51a, lead 49c, adjacent contacts 33a, armature 52, the other contacts 24 and lead 49d to the negative terminal 49e. The circuit above traced gives a slow starting operation of the truck to avoid sudden starts and thereby eliminates undue stresses on the truck and its equipment and imparting swinging motion to any load that may be supported on the hook. When coil 28 is energized it also closes contacts 33a, this resulting bridge eliminating the effectiveness of contacts 44, 37, 40 and 48; coil 28 in operating its armature closes contacts 32 to open contacts 30 and 31, coil 27 being de-energized. The opening of contacts 31 de-energizes coil 35, which after a predetermined time delay, allows its armature 35a to operate and close contacts 36 and open contacts 37 and 37a. Contacts 36 closing, changes the main circuit, so that the resistances 50 and 50a are shorted, thus reducing the external resistance in series with the motor. This results in providing a faster truck speed. The controller 18 may be moved to second operating position, with the effect that switch 19d opens to remove the bridge across contacts 37a, de-energizing coil 38a, which, after a predetermined time delay, allows its armature 38b to operate, closing contacts 39 and opening contacts 40, 40a. The closing of contacts 39 shorts out the remaining series resistance 50b in the main circuit, resistances 50 and 50a having been previously shorted out. Therefore, the motor is connected directly across the supply circuit to effect a still faster truck speed than that available with the controller 18 in the first operating position.

To obtain a faster truck speed, controller 18 is moved to the third operating position, whereupon switch 19c is opened; the opening of switch 19c causes the removal of the bridge across the previously opened contacts 40a, deenergizes coil 45a, which, after a predetermined time delay, operates to close contacts 47, opening contacts 48 and closing contacts 48a. The closing of contacts 47 connects the resistance 50c in parallel with the motor fields and this results in increasing the motor speed and propels the truck at a speed over that which was available in the second operation position of the controller 18.

After attaining the latter speed, the operative can move the controller 18 to the second and first operating position to obtain either running speed above referred to; or the operative can return the controller 18 to neutral position and permit the truck to coast; or he can move the controller to the opposite side of the neutral position—in reverse—and obtain a dynamic braking of the motor, provision being made for three rates of dynamic braking dependent on the position (first, second or third operating position in reverse) to which the controller is moved beyond its neutral position. The dynamic braking may be employed to reduce the truck movement to a speed safe enough to allow the motor to be connected in for reverse operation and to minimize friction brake wear by reducing motor speed before the application of the mechanical brake. By utilizing the dynamic braking to retard the truck movement to a safe speed will prevent damage to the motor and other electrical equipment and minimize the possibility of mechanical failure due to shock.

Also, as will be observed from the foregoing description, if the operative does not choose to operate the controller 18 step-by-step to effect acceleration in motor speed, after once closing the contacts 32 by a dwell in the first operating position, or after dynamic braking, he can move the controller to the second or third operating position and the switch sequence as described step-by-step will function automatically with definite time intervals between the steps to obtain the accelerated speed of the motor.

To obtain the coasting condition already referred to, the operative returns the controller 18 to neutral position, which disconnects the motor from the power supply, by virtue of contacts 32 and 24, 24, opening.

With the truck coasting in the forward direction, dynamic braking thereof may be obtained as follows: the controller 18 is moved to first operating position in reverse, which operation (a) immediately closes contacts 25, 25, to effect a reversal of current supply through the armature 52 and a torque in opposition to the rotative movement of the armature due to the motion of the truck in the forward direction (when contacts 32 are closed) and (b) de-energizes coil 28, so that the spring 29a operates the armature 29 to close contacts 30 and open contacts 32, thereby establishing a circuit through series coil 27 to maintain the contacts 30 closed and contacts 32 open until the motor speed has been retarded to a safe value; and if the controller 18 is not then moved to neutral position, the motor will operate to propel the truck in the reverse direction.

In the first reverse operating position of the controller for dynamic braking, as above set forth, switches 19b, 19d, 19e and 19f are closed; switch 19b energizes coil 23x to close contacts 25, 25, and rock the mechanical interlock 22x to prevent closing of contacts 24, 24. This reverses the armature connections of the motor. Switches 19d and 19f energize coil 38a, opening contacts 39 and closing contacts 40, 40a, and switch 19e energizes coil 42, opening contacts 44; closing contacts 40a energizes coil 45a, which opens contacts 47, 48a, and closes contacts 48; contacts 48a opening, de-energizes coil 42; however, armature 42a does not operate immediately, due to a time delay operation. Since contacts 44 are open, coil 28 cannot be energized during the time interval between the de-energization of coil 42 and closing of contacts 44, whereby the motor will have time to build up and establish a braking current sufficiently high, so that this current through the series coil 27 will hold the double end contactor unit 26 closed against the pull of coil 28. This pull will become evident when contacts 44 close. The main circuit connections for dynamic braking, as above set forth, can be traced as follows: starting with motor armature 52, through lower contacts 25 and series coil 27, contacts 30, resistance 50d, resistance 50b, lead 49b, parallel fields 51, 51a, leads 49c, and upper contacts 25 to armature 52.

With the truck coasting in the forward direction (or being braked by movement of the controller 18 to its first operating position in reverse as above set forth) selective dynamic braking can be obtained by moving the controller to its second or third operating position in reverse, which operation disconnects the reversed motor circuit (which reversal was effected in moving the controller to and through its first operating position in reverse) from the battery and completes it through a resistor, whereupon the motor will operate as a generator, supplying current to the resistor load and producing a torque opposing the rotative motion of the armature 52 due to the forward movement of the truck. In moving the controller 18 to the second operating position in reverse, coil 38a is de-energized causing its armature 38b to operate and close contacts 39; contacts 39 closing, shorts resistance 50b, reducing the resistance in the motor circuit, thereby providing more severe braking effect. To obtain the third dynamic braking effect, the controller 18 is moved to the third reverse operating position, whereby coil 45a is de-energized, causing its armature to operate to close contacts 47; contacts 47 closing, shunts the parallel motor fields 51, 51a, with resistance 50c, to effect another rate of braking action. Each of the described dynamic braking connections will be maintained until the truck speed is retarded and the braking current is reduced to a safe value, whereby pressure on the foot pedal 15 may be relieved to permit application of the mechanical brake and bring the truck to a stop, or the braking connections maintained until the truck movement is stopped. It will be observed that when the controller 18 is in the first reverse operating position for braking and truck speed is reduced to approximately zero, the truck will start moving in the reverse direction unless the controller is moved to the neutral position. However, if the controller 18 is moved to the second or third operating position to effect dynamic braking as above set forth, either contacts 37, 40 or 48 being open, coil 28 cannot be energized and hence truck movement in the reverse direction cannot take place, since this coil closes contacts 32, and these contacts must be closed to connect the motor circuit to the current supply, except upon movement of the controller back to its first operating position for either forward or rearward truck travel.

From the foregoing description it will be observed that the electrical control means associated with the propelling motor include an electrical device consisting of a shunt coil 28 dependent on the operation of the timer coil 42 during braking of the motor and arranged to operate the armature 29 to close contacts 32 to connect the source of current supply to the power circuit 17a and a series coil 27 carrying the current during dynamic braking and arranged to operate the armature 29 to close contacts 30 and maintain them closed against the magnetic influence of the shunt coil 28 on the armature 29 until the motor speed has been reduced to a safe value. As both the shunt and series coils are effective to operate the same armature, the device provides an arrangement wherein the series coil, when energized, maintains the contacts 30 closed against the pull of the shunt coil, thereby providing both a mechanical and an electrical interlock to maintain the braking circuit and speed circuit.

From the foregoing description it also will be observed that when the controller 18 is in the first, second or third operating position and the pressure on the foot pedal 15 is relieved (voluntarily) sufficiently to open the safety switch 16, the power supply is broken through contacts 32, due to de-energization of coil 28 and other coils in the circuit, so that the contacts 32 can only be re-closed by operation of the controller to its first operating position and closing of the safety switch 16. By reason of this control of the motor, operation of the foot pedal 15, with the controller in the first operating position, by the operative, to close and open the safety switch 16, will permit the truck to be moved short distances (known as "inching up") where adjustment of the hook 12 is required to pick up or discharge a load.

It will also be observed that to propel the truck rearwardly, the controller 18 is rotated in the opposite direction (that is, "reverse" as indicated in Fig. 1), initially to the first operating position (thereby closing contacts 25, 25) and then to the second and third operating positions or direct to the latter position, whereby the driving of the motor is controlled in the manner already set forth; likewise, with the truck moving rearwardly by operating the controller beyond its neutral position in the opposite direction three selective dynamic brakings may be effected in the manner already described. Accordingly, it will be observed that the controller may be operated to first, second and third speed positions to propel the truck in either direction and while the truck is so moving the controller may be moved to the remote side of its neutral position to effect dynamic braking in the manner above set forth during forward travel of the truck, so that no matter in which direction the truck is initially propelled its movement may be braked to meet various operating conditions.

To those skilled in the art to which my invention relates, many changes in construction and widely differing embodiments and applications of the invention will be apparent without departing from the spirit and scope thereof. My disclosures and the illustrations herein are purely illustrative and are not intended to be in any sense limiting.

What I claim is:

1. A system for controlling the operation of a motor comprising, in combination, a supply circuit for said motor, circuit controlling means including a reversing controller movable in opposite directions from a neutral position for reversing the connections of said motor with respect to said supply circuit, a line relay controlling the connection of said supply circuit to said reversing controller, means normally biasing said line relay to open position, control circuits controlled by the operation of said controller in either direction for energizing said line relay, a dynamic braking circuit for said motor including a pair of normally closed contacts carried by said line relay and being operated to open position when said line relay is energized, and a holding coil on said line relay energized by current in said braking circuit for holding said line relay in open position while said current is above a predetermined value.

2. A motor control system according to claim 1 wherein the control circuits energized by said reversing controller include a time delay relay having contacts connected in the energizing circuit of said line relay and being operable to delay the operation of said line relay for a predetermined time after operation of said controller from its neutral position in either direction.

3. A motor control system according to claim 1 wherein said reversing controller is provided with a plurality of speed positions in both directions, and the energizing circuit of said line relay includes a pair of normally open contacts, and including means controlled by said controller in the first speed positions only for closing said contacts, and a pair of holding contacts operated by said line relay for by-passing said normally open contacts and maintaining said line relay energized in all speed positions of said controller.

4. A motor control system according to claim 1 wherein said controller is provided with a plurality of speed positions in both directions, and a control relay energized by said controller in the first speed position only and having normally open contacts in the energizing circuit of said line relay for preventing energization of said line relay after dynamic braking in any speed position of said controller except the first position.

5. A motor control system according to claim 1 wherein said controller is provided with a plurality of speed position in both directions, and including a safety switch for controlling the energization of said line relay to disconnect said motor supply circuit, and relay means energized by said controller in low speed position only and having normally open contacts included in the energizing circuit of said line relay for preventing re-connection of said power supply circuit except upon the closing of said safety switch and the movement of said controller to a low speed position.

6. A motor control circuit according to claim 1 wherein said controller is provided with a plurality of speed positions in both directions, and including a resistance in said braking circuit, and means controlled by said controller in the higher speed positions for shunting said resistance to increase the degree of braking during dynamic braking.

7. A system for controlling the operation of a motor comprising, in combination, a supply circuit for said motor, circuit controlling means including a reversing controller movable in opposite directions from a neutral position for reversing the connections of said motor with respect to said supply circuit, a line relay controlling the connection of said supply circuit to said reversing controller, means normally biasing said line relay to open position, control circuits controlled by the operation of said controller in either direction of operation for energizing said line relay, said control circuits including a time delay relay for delaying the operation of said line relay for a predetermined time after operation of said controller in either direction from its neutral position.

EDWARD H. REMDE.

REFERENCES CITED

The following references are of record in the file of this patent:

UNITED STATES PATENTS

| Number | Name | Date |
|---|---|---|
| 509,505 | Wright et al. | Nov. 28, 1893 |
| 777,883 | Carichoff | Dec. 20, 1904 |
| 1,264,992 | Strang | May 7, 1918 |
| 1,373,846 | Van Valkenburg | Apr. 5, 1921 |
| 2,114,196 | Tritle et al. | Apr. 12, 1938 |
| 2,267,381 | Ulinski | Dec. 23, 1941 |
| 2,295,285 | McNairy et al. | Sept. 8, 1942 |
| 2,304,040 | Ulinski | Dec. 1, 1942 |
| 2,313,955 | Martin et al. | Mar. 16, 1943 |
| 2,400,971 | Barclay | May 28, 1946 |